(12) United States Patent
Suzuki et al.

(10) Patent No.: US 8,922,441 B2
(45) Date of Patent: Dec. 30, 2014

(54) RECEIVER

(75) Inventors: Kazuaki Suzuki, Kyoto (JP); Kenya Nagano, Ishikawa (JP)

(73) Assignee: Panasonic Corporation, Osaka (JP)

( * ) Notice: Subject to any disclaimer, the term of this patent is extended or adjusted under 35 U.S.C. 154(b) by 324 days.

(21) Appl. No.: 13/265,104

(22) PCT Filed: Apr. 20, 2010

(86) PCT No.: PCT/JP2010/002837
§ 371 (c)(1),
(2), (4) Date: Oct. 18, 2011

(87) PCT Pub. No.: WO2010/125763
PCT Pub. Date: Nov. 4, 2010

(65) Prior Publication Data
US 2012/0032860 A1 Feb. 9, 2012

(30) Foreign Application Priority Data

Apr. 28, 2009 (JP) .................. 2009-108899

(51) Int. Cl.
| | | |
|---|---|---|
| *H01Q 1/00* | (2006.01) | |
| *H01Q 1/24* | (2006.01) | |
| *F16M 11/00* | (2006.01) | |
| *H01Q 1/08* | (2006.01) | |
| *H01Q 21/28* | (2006.01) | |

(52) U.S. Cl.
CPC . *H01Q 1/24* (2013.01); *H01Q 1/08* (2013.01); *H01Q 21/28* (2013.01)
USPC ............................ 343/720; 343/702; 248/688

(58) Field of Classification Search
CPC ........... H01Q 1/084; H01Q 1/12; H01Q 1/22; H01Q 1/44
USPC .......... 343/702, 720; 248/688, 307, 351, 455, 248/456, 465, 918, 919
See application file for complete search history.

(56) References Cited

U.S. PATENT DOCUMENTS 2,388,567 A * 11/1945 Patterson, Jr. ................. 455/351
4,136,344 A * 1/1979 Nakao et al. .................. 343/702
(Continued)

FOREIGN PATENT DOCUMENTS

JP 61-33508 U 2/1986
JP 02-113475 U 9/1990
(Continued)

OTHER PUBLICATIONS

ITU Report 464-5, "Polarization of Emissions in Frequency-Modulation Broadcasting in Band 8 (VHF)", 1990, ITU, pp. 127-129.*

(Continued)

*Primary Examiner* — Hoang V Nguyen
*Assistant Examiner* — Patrick Holecek
(74) *Attorney, Agent, or Firm* — McDermott Will & Emery LLP (57) ABSTRACT

In order to solve a problem that, if a reinforcing plate of a housing is used as an antenna in a receiver, a desired antenna gain is less likely to be obtained and therefore an antenna gain is degraded, a receiver for receiving information transmitted by a radio wave includes an output portion configured to output information which is receivable by a viewer or another receiver; a stand portion contacting the output portion and configured to hold the output portion on an installation surface at an angle suitable for receiving the information or viewing an image; a reinforcing portion contacting the output portion and the stand portion at points other than a contact point between the output portion and the stand portion and configured to reinforce the output portion and the stand portion so that the angle is maintained; and an antenna portion arranged in a space ensured by at least the reinforcing portion and configured to receive the radio wave.

10 Claims, 8 Drawing Sheets

(56) References Cited

U.S. PATENT DOCUMENTS

| | | | |
|---|---|---|---|
| 5,019,833 A | | 5/1991 | Nonaka |
| 5,300,938 A | * | 4/1994 | Maroun et al. ................ 343/702 |
| 5,396,399 A | * | 3/1995 | Blair et al. ............... 361/679.26 |
| 5,852,423 A | | 12/1998 | Hughes |
| 6,098,952 A | * | 8/2000 | Tonn ............................. 248/688 |
| 7,203,533 B1 | * | 4/2007 | Tischer ...................... 455/575.8 |
| 7,809,414 B2 | * | 10/2010 | Ohki et al. ................. 455/575.4 |
| 2006/0170885 A1 | | 8/2006 | Kitahara |
| 2007/0008231 A1 | * | 1/2007 | Jeon et al. ..................... 343/702 |
| 2007/0026790 A1 | * | 2/2007 | Crohas et al. ................ 455/3.01 |
| 2008/0045279 A1 | | 2/2008 | Ohki |
| 2010/0171671 A1 | * | 7/2010 | Park ............................. 343/720 |

FOREIGN PATENT DOCUMENTS

| | | |
|---|---|---|
| JP | 2005-123705 A | 5/2005 |
| JP | 2005-217895 A | 8/2005 |
| JP | 2005-295135 A | 10/2005 |
| JP | 3120711 U | 3/2006 |
| JP | 2007-028300 A | 2/2007 |
| JP | 4274129 B2 | 3/2009 |

OTHER PUBLICATIONS

International Search Report issued in PCT Application No. PCT/JP2010/002837, dated Jun. 8, 2010.

* cited by examiner

FIG.1

(A)
SIDE VIEW (B)
BOTTOM VIEW

FIG.2

(A) FRONT VIEW (B) BACK VIEW

(A)
SIDE VIEW (B)
SIDE VIEW AFTER RECEIVER IS FOLDED

FIG.6

(A) SIDE VIEW (B) SIDE VIEW AFTER RECEIVER IS FOLDED

FIG.7

(A) BOTTOM VIEW (B) BACK VIEW

FIG.8

(A) SIDE VIEW (B) BACK VIEW

LIQUID CRYSTAL TELEVISION (BACK VIEW)

RECEIVER

RELATED APPLICATIONS

This application is the U.S. National Phase under 35 U.S.C. §371 of International Application No. PCT/JP2010/002837, filed on Apr. 20, 2010, which in turn claims the benefit of Japanese Application No. 2009-108899, filed on Apr. 28, 2009, the disclosures of which Applications are incorporated by reference herein.

TECHNICAL FIELD

The present invention relates to a receiver for receiving a transmitted radio wave including information by an antenna, and particularly relates to a receiver including an antenna receiving a terrestrial television broadcast wave.

BACKGROUND ART

Figure 10:
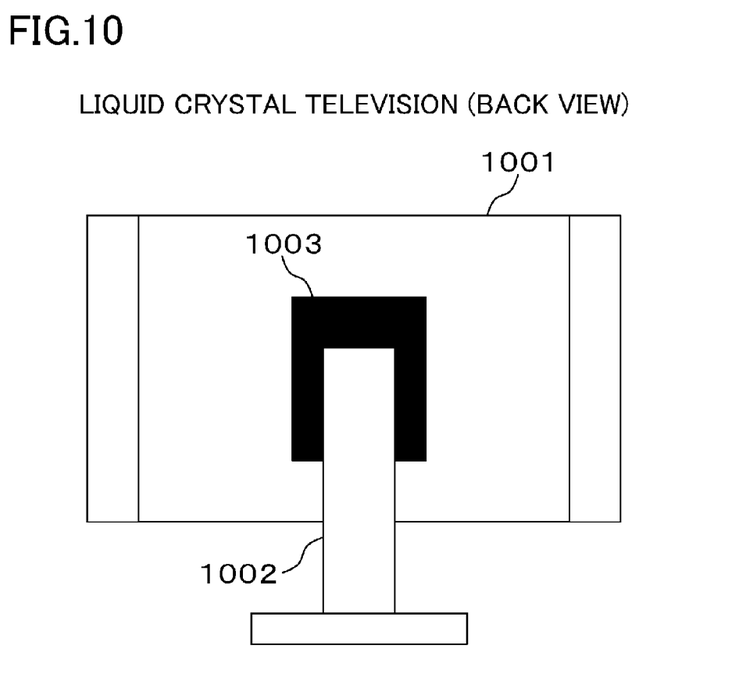
FIG. 10 is a view illustrating a conventional liquid crystal television.

As illustrated in FIG. 10, a television has been conventionally used, in which a reinforcing plate 1003 of a housing, which is for reinforcing a portion where the housing 1001 and a stand portion 1002 are bonded together on a back surface or a side surface of the housing of a main body functions as an antenna (see, e.g., Patent Document 1).

In addition, a projector has been used, which is supported by a tripod 30 connected to a tripod fixing portion 20 and receives a television broadcast wave to project an image (see, e.g., FIGS. 3 and 4 of Patent Document 2).

CITATION LIST

Patent Document

PATENT DOCUMENT 1: Japanese Patent Publication No. 2005-295135
PATENT DOCUMENT 2: Japanese Patent No. 4274129

SUMMARY OF THE INVENTION

Technical Problem

However, although a reinforcing plate used for other purposes may be used as the reinforcing plate of Patent Document 1, strength is required for the reinforcing plate. Thus, conditions are provided, which limit a structure and material of a typical antenna body having a satisfactory strength to support itself. For the foregoing reason, there is a problem that it is difficult to improve an antenna gain and reduce a cost.

In a case where an easily-applicable linear antenna such as a whip antenna is used, when an axial direction of the antenna is horizontal to a ground surface to efficiently receive a horizontally-polarized wave component which is mainly received as a terrestrial television broadcast wave, the gain is the highest. In a case other than the foregoing, when a horizontal length of an antenna, which is a projection component to a plane horizontal to the ground surface is longer than a vertical length of the antenna, which is a projection component to a plane vertical to the ground surface, the gain is less likely to be degraded. However, there is a problem that, if it is difficult to arrange the reinforcing plate so as to point in the foregoing direction due to conditions limiting an installation position etc., the reinforcing plate cannot be used. In addition, the reinforcing plate has not been disclosed, which has a high antenna gain.

Since the reinforcing plate is exposed, the reinforcing plate may be damaged or deformed due to external factors such as collision with other objects. Thus, there is a problem that directivity of the antenna may be changed or the antenna gain may be degraded.

In Patent Document 2, legs 31, 32, 33 of the tripod 30 are used as an antenna 310. However, as in Patent Document 1, strength is required for the tripod 30. Thus, conditions are provided, which limit a structure and material of the tripod 30. For the foregoing reason, there is a problem that it is difficult to reduce a cost.

If the tripod 30 is used in a state in which each of the legs 31, 32, 33 is vertical to an installation surface or is slightly inclined to the horizontal direction from the vertically-arranged state, an antenna is configured, which has a higher gain for vertically-polarized wave as compared to that of the linear antenna. Thus, there is a problem that an antenna gain for horizontally-polarized wave mainly used for television broadcasting is reduced. In addition, a problem also arises, in which an opening of the tripod 30 is decreased, and therefore the tripod 30 is likely to be fell down.

If the tripod 30 is used in a state in which each of the legs 31, 32, 33 is horizontal to the installation surface or is slightly inclined to the vertical direction from the horizontally-arranged state, e.g., a wavelength is around 60 cm at a UHF band used for the television broadcasting. In a case where a ¼ wavelength monopole antenna is used, a leg of equal to or longer than 15 cm is required. For the foregoing reason, there are the following problems: an area required for installation of a small-size receiver and a protrusion are increased in size in a state in which the tripod is opened; it is difficult to improve an installation height of a main body; and a space which is significant for heat radiation and is arranged below the main body is reduced. If a VHF band is used, the VHF band corresponds to a wavelength longer than that corresponding to the UHF band, resulting in a longer antenna length and an increase in the installation area and the protrusion. For the foregoing reason, there is a problem that it is difficult to improve the installation height and dissipate heat. In a state in which the tripod 30 is closed, the legs 31, 32, 33 used as heat dissipating members approach the main body. Thus, there are the following problems: it is difficult to dissipate heat, and therefore a false operation may be caused due to heat; the main body interferes with receipt of a radio wave by the antenna, and therefore receiving sensitivity is degraded; and the legs 31, 32, 33 approach conductive bodies of the main body, such as circuits, conductive wires, and terminals to cause degradation of electromagnetic induction, and therefore the antenna gain is likely to be degraded.

In this case, an antenna configuration has not been disclosed, in which the antenna gain is maintained high for a horizontally-polarized wave.

If a conductive body is provided around the installation surface of the receiver, when the antenna 310 approaches the conductive body, a problem arises, in which the degradation of the electromagnetic induction is caused, thereby degrading the antenna gain.

Since the tripod 30 is exposed, the antenna may be damaged or deformed due to external factors such as collision with other objects. Thus, there is a problem that the directivity of the antenna may be changed or the antenna gain may be degraded.

The present invention has been made in order to solve the foregoing conventional problems, and it is an objective of the present invention to provide a receiver in which a desired antenna gain is likely to be obtained, and the antenna gain is not likely to be degraded.

In addition, it is an objective of the present invention to provide a small-size receiver having a high antenna gain for horizontally-polarized wave mainly used as a terrestrial broadcast wave.

Further, it is an objective of the present invention to provide a small-size receiver in which, even if a large-size antenna or a plurality of antennas is/are installed, an antenna installation space above the receiver and a protrusion are decreased in size.

Solution to the Problem

In order to achieve the foregoing objectives, the present invention is characterized in that a receiver for receiving information transmitted by a radio wave includes an output portion configured to output information which is receivable by a viewer or another receiver; a stand portion contacting the output portion and configured to hold the output portion on an installation surface at an angle suitable for receiving the information or viewing an image; a reinforcing portion contacting the output portion and the stand portion at points other than a contact point between the output portion and the stand portion and configured to reinforce the output portion and the stand portion so that the angle is maintained; and an antenna portion arranged in a space ensured by at least the reinforcing portion and configured to receive the radio wave.

In order to achieve the foregoing objectives, the present invention is characterized in that a horizontal length of the antenna portion is longer than a vertical length of the antenna portion to a ground surface.

In order to achieve the foregoing objectives, the present invention is characterized in that, in the antenna portion, a gain for horizontally-polarized wave is higher than a gain for vertically-polarized wave in a predetermined direction.

In order to achieve the foregoing objectives, the present invention is characterized in that a contact point of the reinforcing portion with the output portion or the stand portion is movable.

In order to achieve the foregoing objectives, the present invention is characterized in that a contact point of the antenna portion with the output portion, the stand portion, or the reinforcing portion is movable.

In order to achieve the foregoing objectives, the present invention is characterized in that the reinforcing portion includes a movable portion at a point other than the contact point of the reinforcing portion with the output portion or the stand portion.

In order to achieve the foregoing objectives, the present invention is characterized in that the antenna portion includes a movable portion at a point other than the contact point of the antenna portion with the output portion, the stand portion, or the reinforcing portion.

In order to achieve the foregoing objectives, the present invention is characterized in that part of an outer portion of the output portion, the stand portion, or the reinforcing portion is made of nonmetal.

In order to achieve the foregoing objectives, the present invention is characterized in that the antenna portion is a diversity antenna or an array antenna including a plurality of antenna elements.

In order to achieve the foregoing objectives, the present invention is characterized in that the receiver further includes a second antenna portion different from the antenna portion, and the antenna portion and the second antenna portion form the diversity antenna or the array antenna.

Advantages of the Invention

According to the receiver of the present invention, the antenna is arranged in the space ensured by the reinforcing portion etc., thereby realizing an antenna structure corresponding to polarized wave characteristics of a received radio wave. In such a manner, the following advantages can be realized: an antenna gain for desired polarized wave is likely to be obtained; and even an easily-applicable antenna having insufficient strength can be protected from external factors by other components such as the output portion, the stand portion, and the reinforcing portion, and therefore performance degradation due to damage, deformation, etc. can be prevented. In addition, no antenna element protrudes from the receiver. Thus, the following advantage can be realized: a design of the receiver is improved; conditions limiting arrangement of the receiver is reduced; an installation area for a small-size receiver is reduced; or no space in which the antenna is installed is required above a main body or a stand.

According to the receiver of the present invention, the horizontal length of the antenna portion is longer than the vertical length of the antenna portion to the ground surface. In such a manner, an advantage can be realized, in which a gain of, e.g., a liner antenna for a terrestrial television broadcast wave including a horizontally-polarized wave component as a main component is increased.

According to the receiver of the present invention, in the antenna, the gain for horizontally-polarized wave is higher than the gain for vertically-polarized wave in the predetermined direction. In such a manner, an advantage can be realized, in which the gain for terrestrial television broadcast wave is increased in a desired antenna.

According to the receiver of the present invention, the contact point of the reinforcing portion with the output portion or the stand portion is movable. In such a manner, an advantage can be realized, in which the receiver can be easily carried, stored, and installed in a state in which the stand portion and the reinforcing portion are in proximity to the output portion.

According to the receiver of the present invention, the contact point of the antenna portion with the output portion, the stand portion, or the reinforcing portion is movable. In such a manner, the following advantages can be realized: the antenna gain for desired polarized wave can be easily obtained in the predetermined direction; and the receiver can be easily carried, stored, and installed in a state in which the antenna portion is in proximity to the stand portion, the reinforcing portion, or the output portion.

According to the receiver of the present invention, the reinforcing portion includes the movable portion at the point other than the contact point of the reinforcing portion with the output portion or the stand portion. In such a manner, an advantage can be realized, in that deformation of the reinforcing portion, such as folding and sliding is allowed, thereby improving the carrying, the storage, and the installation of the receiver.

According to the receiver of the present invention, the antenna portion includes the movable portion at the point other than the contact point of the antenna portion with the output portion, the stand portion, or the reinforcing portion. In such a manner, the following advantages can be realized: shape change, folding, and sliding of the antenna portion is allowed, and therefore the antenna gain may be improved in the predetermined direction; and the carrying, the storage, and the installation of the receiver are improved.

According to the receiver of the present invention, the part of the outer portion of the output portion, the stand portion, or the reinforcing portion is made of nonmetal. In such a manner, an advantage can be realized, in that occurrence of a back-flow of a current component on the antenna in an adjacent region can be prevented, thereby improving the antenna gain.

According to the receiver of the present invention, the antenna portion is the diversity antenna or the array antenna including the plurality of antenna elements. In such a manner, an advantage can be realized, in that improvement in receiving sensitivity, control of directivity, and improvement in a transmission capacity by, e.g., special multiplexing are allowed.

According to the receiver of the present invention, the antenna portion and the second antenna portion different from the antenna portion form the diversity antenna or the array antenna. In such a manner, an advantage can be realized, in that further improvement in receiving sensitivity, further control of directivity, and further improvement in a transmission capacity by, e.g., special multiplexing are allowed.

DESCRIPTION OF EMBODIMENTS

As an example of the present invention, a receiver for receiving a terrestrial television broadcast wave by an antenna will be described.

First Embodiment

A receiver of a first embodiment of the present invention will be described below with reference to the drawings.

Figure 1:
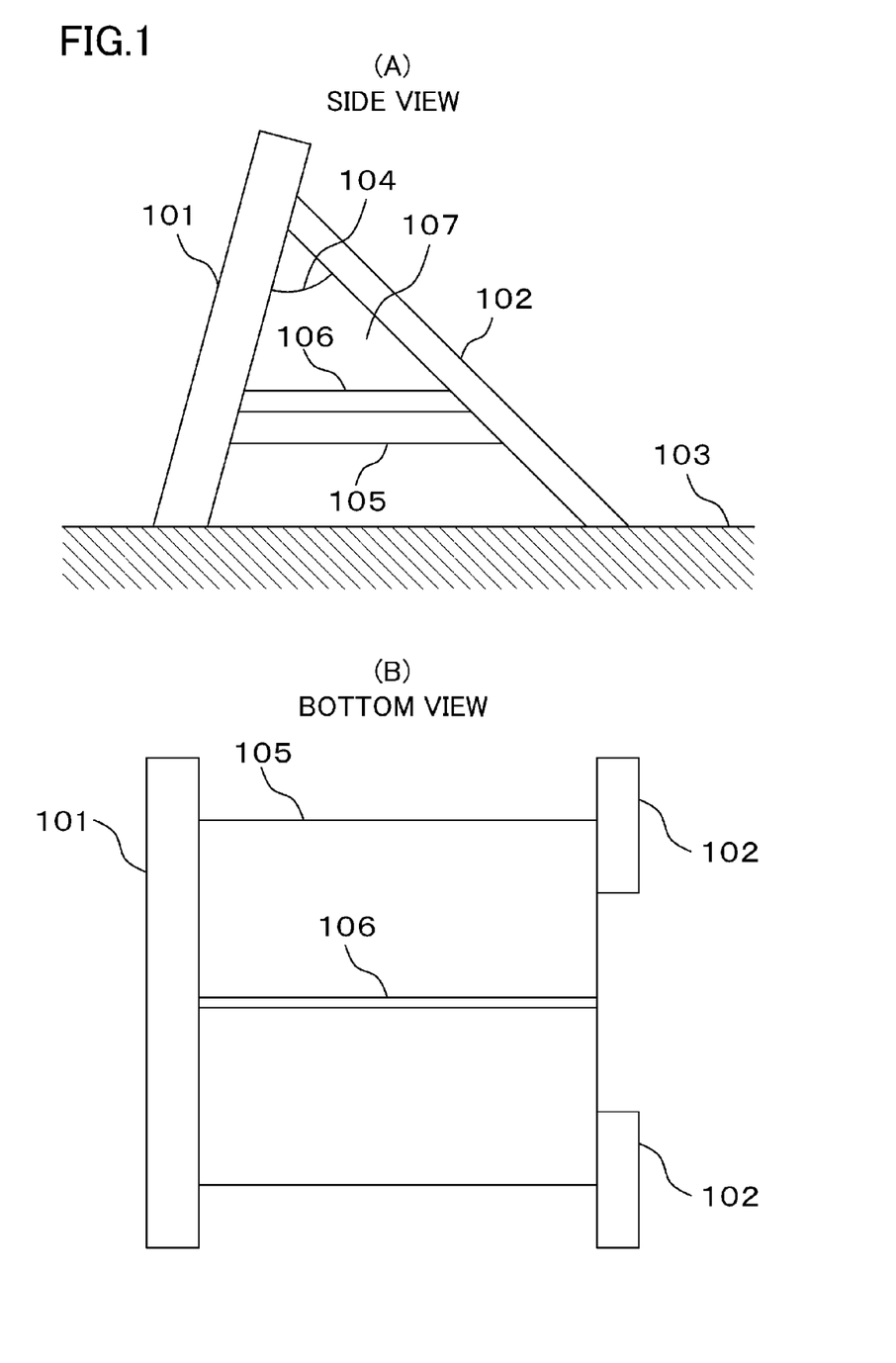
FIG. 1(A) is a side view of a receiver of a first embodiment of the present invention.
FIG. 1(B) is a bottom view of the receiver of the first embodiment of the present invention.
Figure 2:
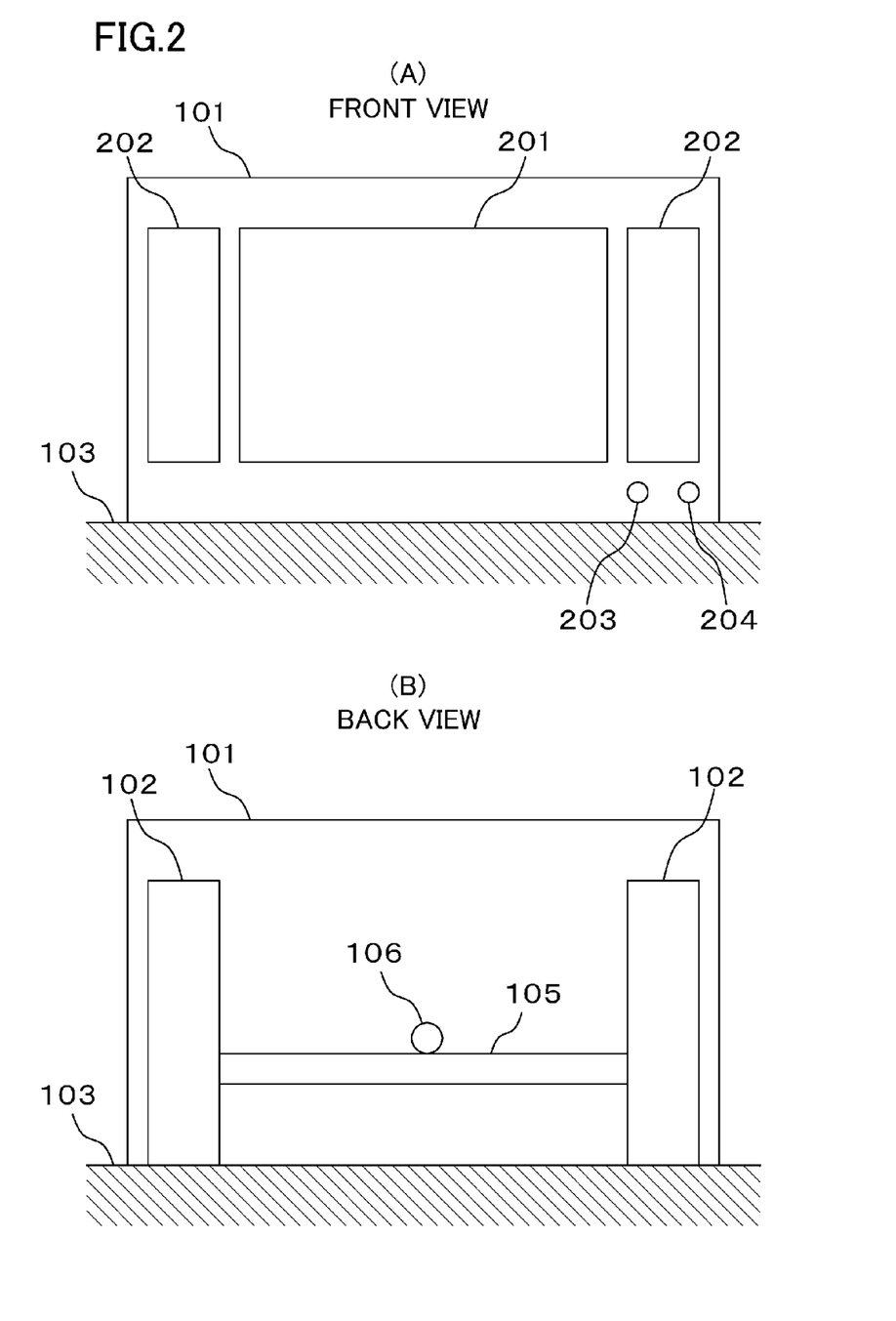
FIG. 2(A) is a front view of the receiver of the first embodiment of the present invention.
FIG. 2(B) is a back view of the receiver of the first embodiment of the present invention.

FIGS. 1 and 2 are views illustrating a configuration of the receiver of the present invention. The present invention is characterized in that, as illustrated in FIGS. 1 and 2, an antenna portion 106 is arranged in a space ensured by a reinforcing portion 105.

FIG. 1(A) is a view of the receiver from side. Stand portions 102 contact an output portion 101, and hold the output portion 101 on an installation surface 103 at an angle 104 suitable for receiving a radio wave or viewing an image. The reinforcing portion 105 contacts the output portion 101 and the stand portions 102 at points other than a contact point between the output portion 101 and each of the stand portions 102, and reinforces the output portion 101 and the stand portions 102 so that the angle 104 is maintained. The antenna portion 106 is arranged in a space 107 defined by the reinforcing portion 105, the output portion 101, the stand portions 102, etc. In the present example, the antenna portion 106 is arranged above the reinforcing portion 105.

FIG. 1(B) is a view of the receiver from bottom, and illustrates a configuration in a state in which the antenna portion 106 can be viewed through the reinforcing portion 105. The antenna portion 106 is configured so that the antenna portion 106 is connected to the output portion 101 and part of the output portion 101 is ground (GND) for the antenna portion 106, and is a monopole antenna.

FIG. 2(A) is a view of the receiver from front. The output portion 101 includes a display section 201 for outputting information which can be received by a viewer, i.e., displaying still images, moving images, character strings, light, etc.; a sound producing section 202 for producing sound etc.; a display terminal 203 for outputting information which can be received by another receiver such as projectors, headphones, etc., i.e., outputting a signal based on which still images, moving images, character strings, light, etc. can be displayed; and a sound producing terminal 204 for producing sound etc.

FIG. 2(B) is a view of the receiver from back. The stand portions 102 are arranged on right and left sides to maintain the angle 104, thereby ensuring stable installation of the receiver. In addition, the space is formed near the antenna portion 106, thereby facilitating receipt of a radio wave by the antenna portion 106.

It is desirable as a condition for improving an antenna gain that a large structure for GND is arranged in proximity to a lower power feeding point of an antenna. If the GND is arranged closer to a higher power feeding point of the antenna, the GND is positioned around an electric field receiving portion of the antenna. The GND is typically made of metal. In such a case, current in a direction opposite to current flowing on the antenna is generated on the GND. Thus, an electric field in a direction opposite to that of the antenna is generated in a space around the GND, thereby degrading the antenna gain in combination with radio wave shielding by the metal. As a result, it is desirable that the GND is not provided on a side closer to the higher power feeding point of the antenna, or the metal is not placed near the higher power feeding point of the antenna.

An electric circuit is typically formed in an output portion, and has a metal portion. If an installation surface is part of furniture such as desks etc., such furniture may be made of metal. In such a case, since the furniture may function as a large structure for GND for the antenna, the antenna should be apart from the installation surface in most cases.

A gain characteristic of the antenna is changed depending on material, a structure, etc. of the antenna. Typically, the antenna is made of metal. There is a possibility that the antenna is deformed, damaged, or deteriorated due to external factors such as contact with a human body or an object such as furniture, and therefore the gain characteristic is changed and degraded in most cases.

For the foregoing reason, in order to configure an antenna in which the antenna gain is high and is less likely to be degraded, the foregoing conditions can be satisfied by using GND for the output portion 101 as the GND for the antenna, providing the reinforcing portion 105 between the output portion 101 and each of the stand portions 102 to form the space 107, and forming, e.g., part of outer portions of the output portion 101, the stand portions 102, and the reinforcing portion 105 with nonmetal such as wood, glass, and resin so that the antenna portion 106 can be freely arranged at least in the space 107. Then, the antenna portion 106 is configured as described above.

In signal processing, the antenna portion 106 receives a carrier wave with information to be transmitted, and then a received signal is input to the output portion 101 under a suitable input condition. Subsequently, tuning, demodulation, error correction, information source decoding, etc. are performed in a tuner and an information processing section which are mounted in the output portion 101, and desired signals are output to the display section 201, the sound producing section 202, the display terminal 203, and the sound producing terminal 204.

Figure 3:
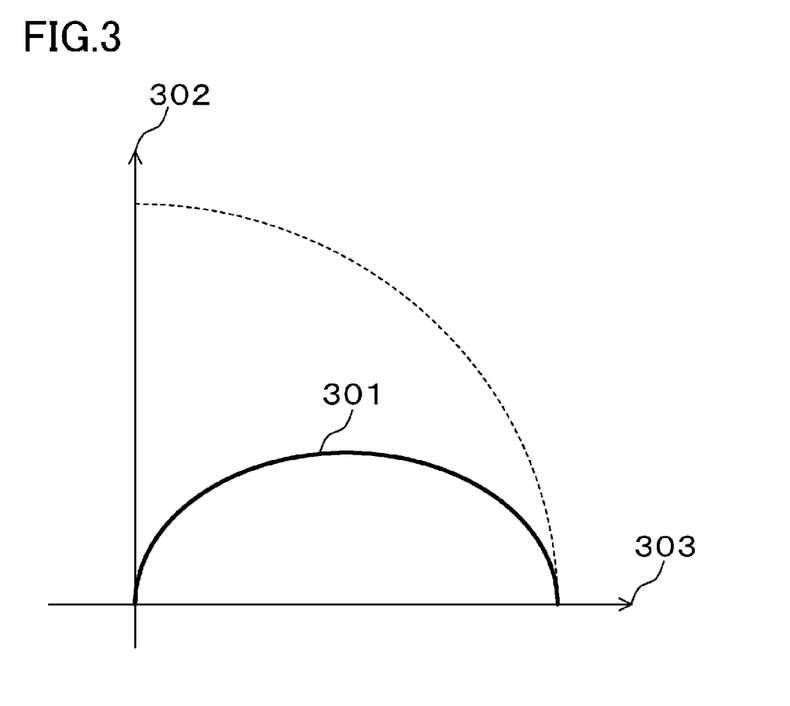
FIG. 3 is a view illustrating directivity of a monopole antenna.

FIG. 3 illustrates directivity in a plan including an axis of the monopole antenna. Directivity 303 is shown, in which a lowest gain is obtained in a direction 302 parallel to the axis of the monopole antenna, and a highest gain is obtained in a direction 303 perpendicular to the axis of the monopole antenna.

As illustrated in FIG. 3, the monopole antenna has the highest gain in the direction perpendicular to the axis thereof. For a terrestrial television broadcast wave including a horizontally-polarized wave component as a main component, the antenna portion may point in a direction in which a gain for horizontally-polarized wave is high. Such a state is equivalent to a state in which a linear antenna is arranged so that an axis thereof is along the horizontal direction. However, if it is difficult in terms of, e.g., a design and strength that the linear antenna is arranged so that the axis thereof is along the horizontal direction, the axis may be inclined to the horizontal direction.

Figure 4:
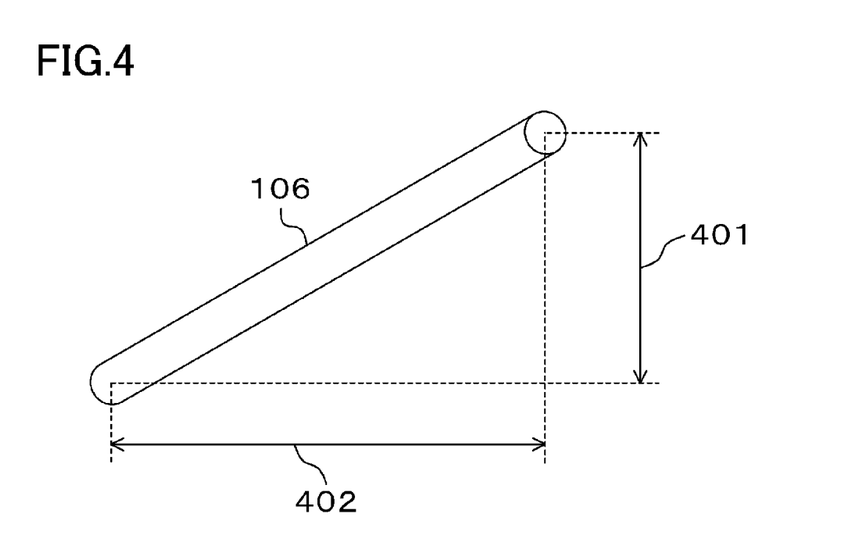
FIG. 4 is a view illustrating a horizontal length and a vertical length when an antenna is arranged so as to be inclined.

FIG. 4 is a view illustrating arrangement in which the antenna is inclined. For the sake of simplicity, the components other than the antenna portion 106 are omitted, and a vertical length 401 of the antenna portion 106 to a ground surface and a horizontal length 402 of the antenna portion 106 are illustrated.

As illustrated in FIG. 4, when the antenna portion 106 is inclined to the horizontal direction, directivity for a horizontally-polarized wave is determined based on a horizontal component of current flowing on the antenna. A longer horizontal length than the vertical length results in a greater horizontal component than a vertical component of current, and the gain for horizontally-polarized wave is higher than a gain for vertically-polarized wave. Thus, the antenna portion 106 is suitable for receiving a terrestrial television broadcast wave. The antenna portion 106 is configured as described above.

Second Embodiment

A receiver of a second embodiment of the present invention will be described below with reference to the drawings.

Figure 5:
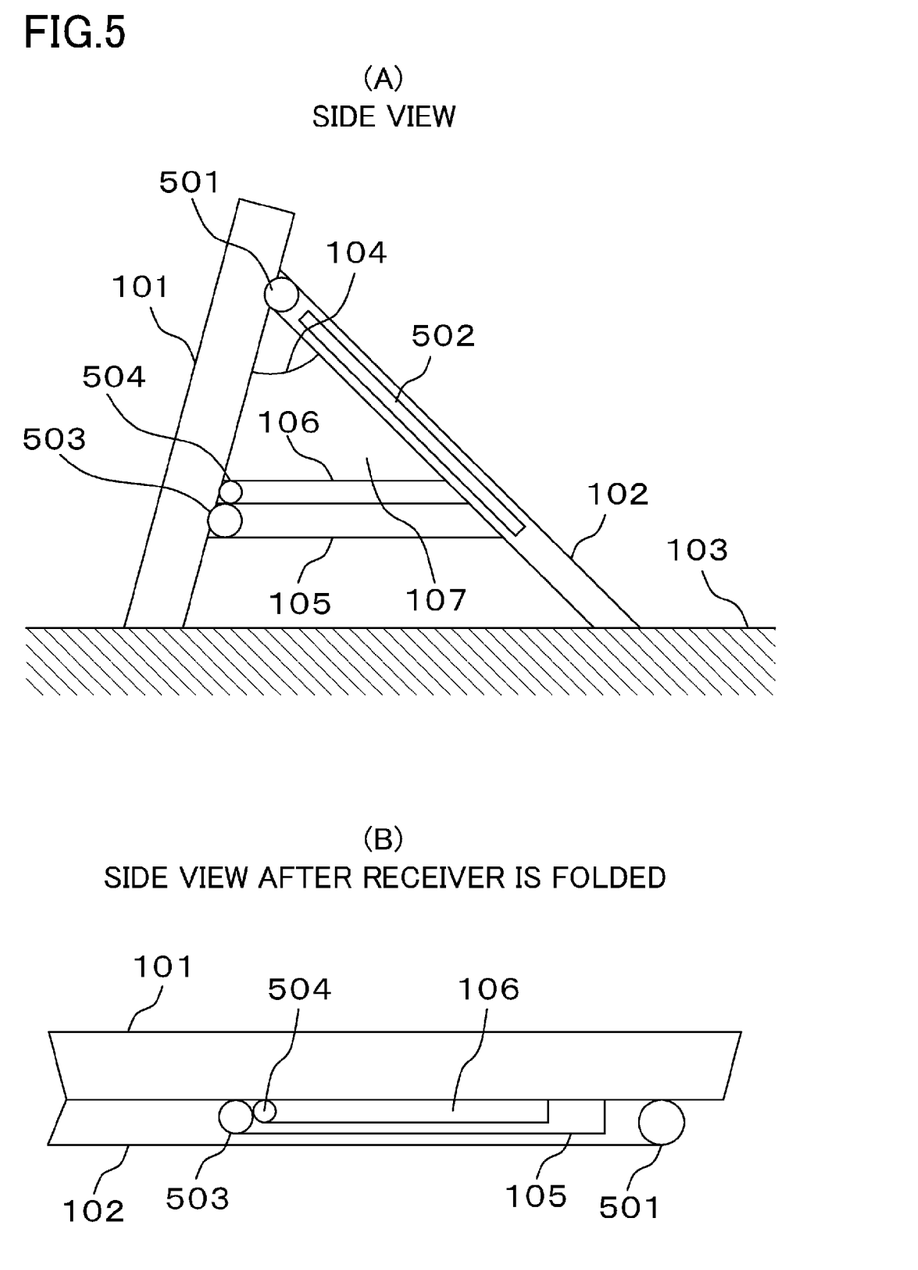
FIG. 5(A) is a side view of a receiver of a second embodiment of the present invention.
FIG. 5(B) is a side view of the folded receiver of the second embodiment of the present invention.

FIG. 5 is a view illustrating a configuration of the receiver of the present invention. As will be seen from FIG. 5, the present invention is characterized in that a contact point between a reinforcing portion 105 and each of an output portion 101 and stand portions 102 is movable, and a contact point between an antenna portion 106 and each of the output portion 101, the stand portions 102, and the reinforcing portion 105 is movable. Note that both of the foregoing features of the present invention are not necessarily required, and either one of the features may be employed.

Since the second embodiment is partially similar to the first embodiment in a configuration thereof, only a difference in the configuration will be described.

FIG. 5(A) is a view of the receiver from side.

The output portion 101 includes a first movable portion 501 provided with, e.g., a hinge at a contact point between the output portion 101 and the stand portion 102, and therefore an angle 104 is changeable.

The stand portion 102 includes a sliding portion 502 at the contact point between the stand portion 102 and the reinforcing portion 105, and therefore the contact point is movable along the sliding portion 502.

The reinforcing portion 105 includes a second movable portion 503 at the contact point between the reinforcing portion 105 and the output portion 101, and therefore an angle formed by the reinforcing portion 105 and the output portion 101 is changeable.

The antenna portion 106 includes a third movable portion 504 at the contact point between the antenna portion 106 and the output portion 101, and therefore the antenna portion 106 is movable so as to point in any directions in the space 107. Note that, if possible, the antenna portion 106 may be moved to outside the space 107.

The first movable portion 501, the sliding portion 502, the second movable portion 503, and the third movable portion 504 allow the stand portions 102, the reinforcing portion 105, and the antenna portion 106 to approach the output portion 101 with the foregoing contact state being maintained, thereby folding the receiver. Arrangement of the foregoing components is as illustrated in FIG. 5(B) when viewing the components through part of the receiver in the folded state.

Third Embodiment

A receiver of a third embodiment of the present invention will be described below with reference to the drawings.

Figure 6:
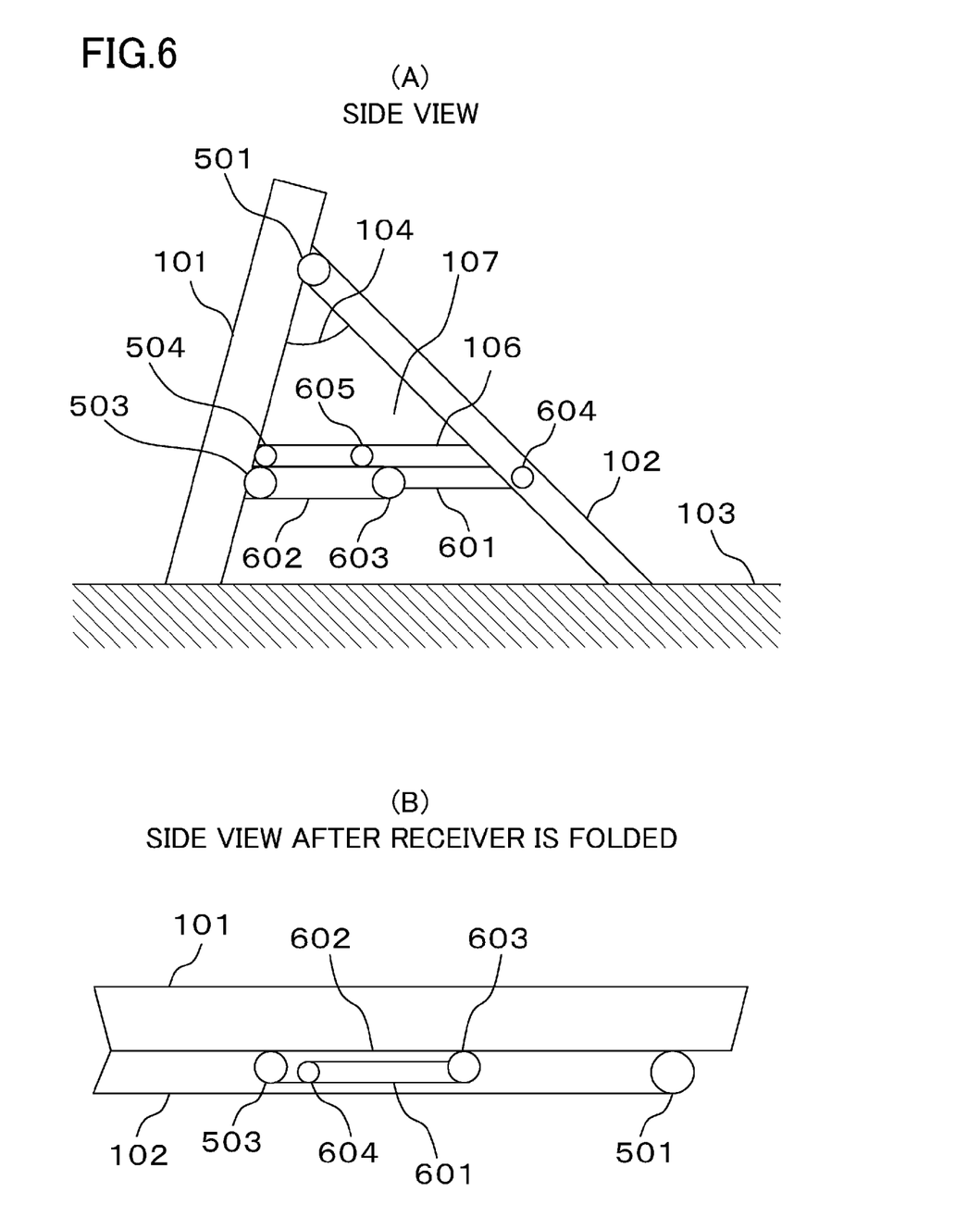
FIG. 6(A) is a side view of a receiver of a third embodiment of the present invention.
FIG. 6(B) is a side view of the folded receiver of the third embodiment of the present invention.

FIG. 6 is a view illustrating a configuration of the receiver of the present invention. As will be seen from FIG. 6, the present invention is characterized in that a reinforcing portion 105 includes a movable portion at a point other than a contact point between the reinforcing portion 105 and each of an output portion 101 and stand portions 102, and an antenna portion 106 includes a movable portion at a point other than a contact point between the antenna portion 106 and each of the output portion 101, the stand portions 102, and the reinforcing portion 105.

Since the third embodiment is partially similar to the first and second embodiments in a configuration thereof, only a difference in the configuration will be described.

A first reinforcing portion 601 and a second reinforcing portion 602 in the present embodiment form the reinforcing portion 105 of the foregoing embodiments. A fourth movable portion 603 is provided at a contact point between the first reinforcing portion 601 and the second reinforcing portion 602, and a fifth movable portion 604 is provided at a contact point between each of the stand portions 102 and the first reinforcing portion 601.

As in the reinforcing portion, two portions form the antenna portion 106, and a sixth movable portion 605 is provided at a contact point between the two portions.

In the present embodiment, a folding method different from that of the second embodiment is employed. The reinforcing portion is bent about a fulcrum, i.e., the fourth movable portion 603, and can be folded without the first reinforcing portion 601 and the second reinforcing portion 602 obstructing each other.

Similarly, the antenna portion is bent about a fulcrum, i.e., the sixth movable portion 605, and can be folded without the two portions which form the antenna portion obstructing each other.

The stand portions 102 and the first reinforcing portion 601 pivot about a fulcrum, i.e., the fifth movable portion 604, and the receiver can be folded without the stand portions 102 and the first reinforcing portion 601 obstructing each other.

In a configuration in which the folded reinforcing portion and the folded antenna portion are arranged without such portions obstructing each other, the first movable portion 501, the second movable portion 503, the third movable portion 504, the fourth movable portion 603, the fifth movable portion 604, and the sixth movable portion 605 allow the stand portions 102, the first reinforcing portion 601, the second reinforcing portion 602, and the antenna portion 106 to approach the output portion 101 with the foregoing contact state being maintained, thereby folding the receiver. Arrangement of the foregoing components is as illustrated in FIG. 6(B) when viewing the components through part of the receiver in the folded state.

Fourth Embodiment

A receiver of a fourth embodiment of the present invention will be described below with reference to the drawings.

Figure 7:
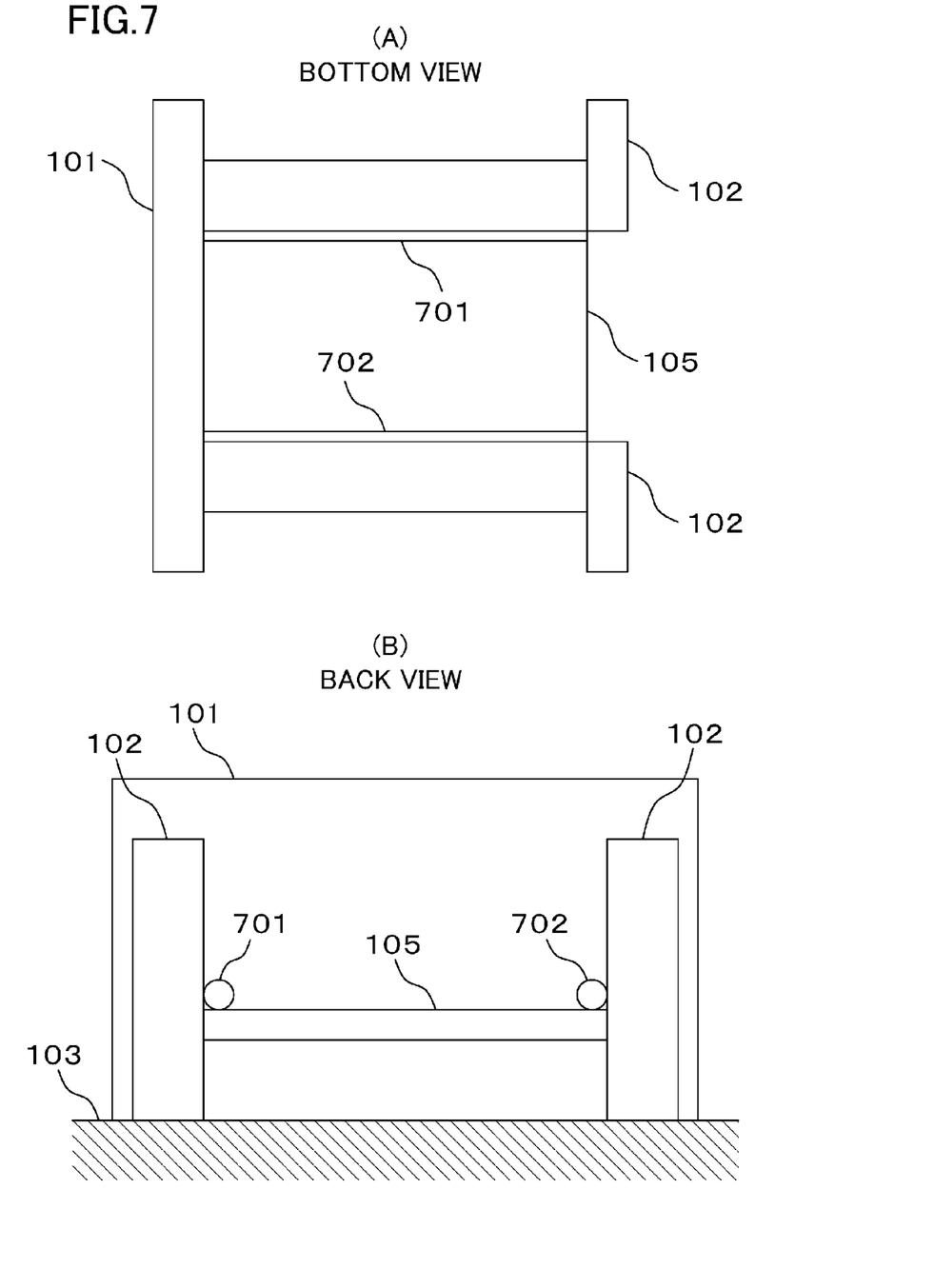
FIG. 7(A) is a bottom view of a receiver of a fourth embodiment of the present invention.
FIG. 7(B) is a back view of the receiver of the fourth embodiment of the present invention.

FIG. 7 is a view illustrating a configuration of the receiver of the present invention. As will be seen from FIG. 7, the present invention is characterized in that a plurality of antenna elements form an antenna portion.

Since the fourth embodiment is partially similar to the first embodiment in a configuration thereof, only a difference in the configuration will be described.

As viewed from the back of the receiver, the antenna portion includes a first antenna element 701 on the left side and a second antenna element 702 on the right side. Note that arrangement of each of the antenna elements is changeable.

In order to improve receiving sensitivity of a desired signal, the output portion 101 performs diversity such as selection combining and maximal-ratio combining. Thus, the antenna portion uses the plurality of antenna elements as a diversity antenna.

In order to improve the receiving sensitivity of the desired signal, an adaptive antenna array for controlling directivity of an antenna group including a plurality of antenna elements is employed in the output portion 101. Thus, the antenna portion uses the plurality of antenna elements as an array antenna.

In order to not only improve the receiving sensitivity of the desired signal but also improve a transmission capacity by special multiplexing, the output portion 101 performs a MIMO transmission. Thus, the antenna portion uses the plurality of antenna elements as the array antenna.

Fifth Embodiment

A receiver of a fifth embodiment of the present invention will be described below with reference to the drawings.

Figure 8:
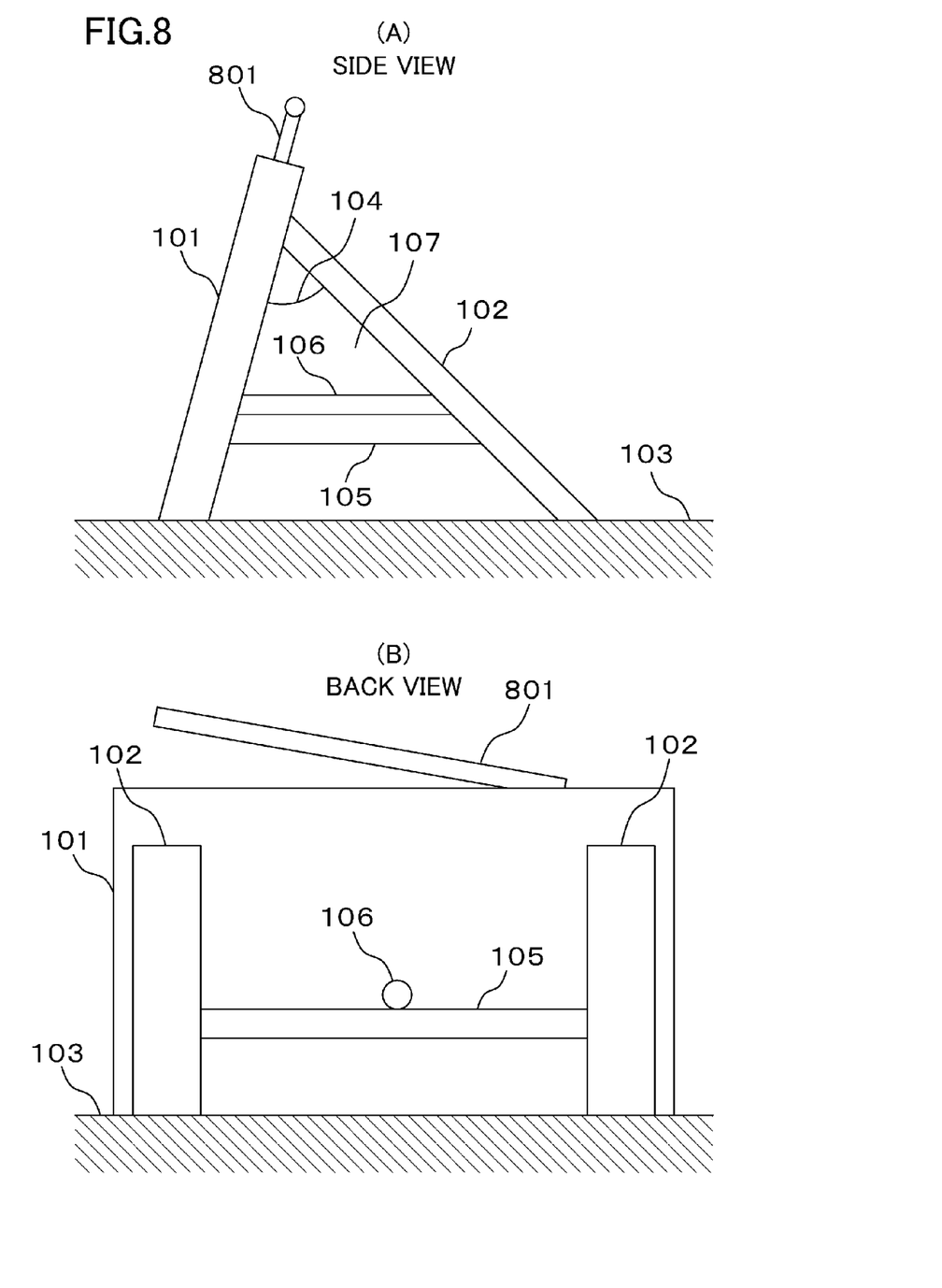
FIG. 8(A) is a side view of a receiver of a fifth embodiment of the present invention.
FIG. 8(B) is a back view of the receiver of the fifth embodiment of the present invention.

FIG. 8 is a view illustrating a configuration of the receiver of the present invention. As will be seen from FIG. 8, the present invention is characterized in that a second antenna portion different from an antenna portion is provided outside a space 107.

Since the fifth embodiment is partially similar to the first embodiment in a configuration thereof, only a difference in the configuration will be described.

A second antenna portion 801 different from an antenna portion 106 is provided on an upper surface of an output portion.

Figure 9:
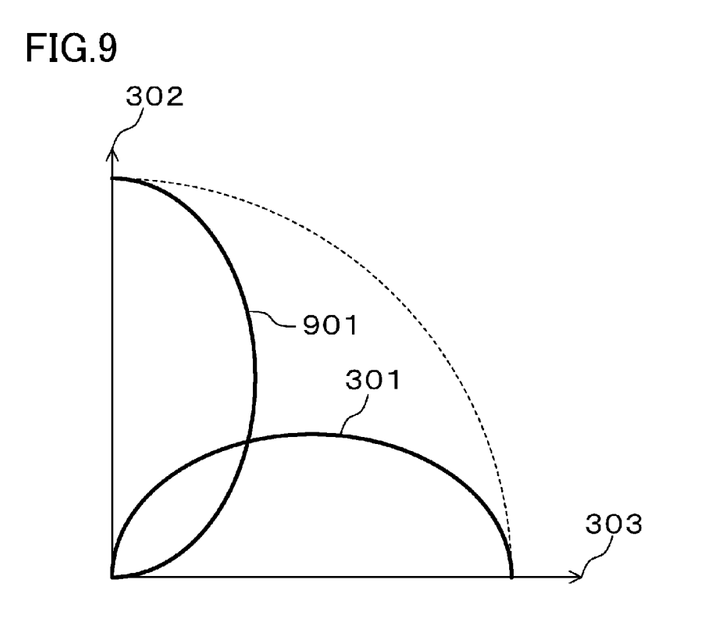
FIG. 9 is a view illustrating a relationship of directivity of an antenna group in the fifth embodiment of the present invention.

In a horizontal plane, the antenna portion 106 and the second antenna portion 801 are arranged so as to be displaced by 90 degrees. As illustrated in FIG. 9, as compared to directivity 301 of the antenna portion 106, directivity 901 of the second antenna portion 801 shows a relationship in which gain degradation can be compensated in a direction in which a gain is degraded.

The antenna portion 106 and the second antenna portion 801 are regarded as an antenna group, and form a diversity antenna or an array antenna as in the fourth embodiment.

(Remarks)

Needless to say, the present invention is not limited to the contents described in the foregoing embodiments. That is, the present invention may be configured as follows:

(1) The present invention is not limited to the receiver for terrestrial television broadcasting, and may be used as a receiver for receiving any types of radio waves. For example, the present invention may be used for terrestrial radio broadcasting, data broadcasting, wireless communication, radio wave measurement, etc;

(2) Not only the structure illustrated in the figures and described in the specification but also any structures may be used for all components. For example, the structure is employed, in which the two stand portion 102 is provided on the right and left sides. However, a single stand portion 102 or three or more stand portions 102 may be provided. In addition, the stand portion 102 may be formed not only in a straight shape but also in any shapes such as an "H" shape, an "X" shape, a recessed shape. Further, the reinforcing portion 105 and the antenna portion 106 may point in any directions and may be formed in any shapes;

(3) The output portion 101 does not necessarily include all of the display section 201, the sound producing section 202, the display terminal 203, and the sound producing terminal 204, and may include at least one of the foregoing components;

(4) The antenna portion is not necessarily the monopole antenna, and may be any types of antennas. For example, the antenna portion may be a dipole antenna, a whip antenna, a rod antenna, a slit antenna, a loop antenna, a patch antenna, a top-loaded antenna, a meander antenna, a helical antenna, an L antenna, an inverted F antenna, etc.;

(5) The antenna portion may be arranged not only in the space defined by the reinforcing portion 105, the output portion 101, the stand portions 102, etc. but also in other spaces. For example, the antenna portion may be arranged in a space provided in the reinforcing portion 105, the output portion 101, or the stand portion 102, a space outside the receiver, etc.;

(6) The configuration is not necessarily employed, in which part of the output portion 101 is used as the GND for the antenna portion, and any locations or portions may be used. For example, part of the stand portion 102, the reinforcing portion 105, etc. may be used;

(7) Additional circuits may be added to the antenna portion. For example, a matching circuit, an amplifier circuit, etc. may be provided;

(8) For the antenna portion, a control section for controlling a direction of the antenna may be further provided in the receiver, and the antenna may be moved or deformed to obtain a gain for desired polarized wave;

(9) The position of each component in a state in which the receiver is folded is not limited to the foregoing, and each component may be in any positions. The movement of each component when folding the receiver is not limited to the foregoing, and each component may provide any movement. For example, the first and second reinforcing portions may be folded in a direction opposite to that described above;

(10) For each component provided for folding the receiver, any components may be added or omitted as necessary. In addition, the folding method is not limited to the foregoing, and any folding methods may be employed. For example, in a state in which the slide portion is not provided, the stand portions and the reinforcing portion may be temporarily disconnected from each other. Then, the reinforcing portion is folded, followed by folding the stand portions;

(11) The number of antenna elements of the antenna portion is not limited to the foregoing, and any number of antenna elements may be provided. In addition, any arrangement of the antenna portion may be employed. For example, the antenna portion may point in any directions;

(12) As the receiver, a receiving circuit which can realize the same processing as that of the receiver may be employed. An integrated circuit may form part of the receiving circuit. The integrated circuit may be, e.g., LSIs, CPUs, DSPs, GPUs, MPUs, FPGAs, reconfigurable processors, etc., and may be implemented or integrated by a technique different from a semiconductor technique. For example, a circuit or an integrated circuit configured by using optical signal processing or quantum mechanics may be employed. Part of processing performed in the integrated circuit may be performed by a program. Such a program may be provided as contents of a recording medium or a communication service; and (13) All of the foregoing embodiments or any parts of the Remarks may be combined and implemented. For example, a configuration may be employed, in which the receiver is foldable by using a plurality of antennas.

INDUSTRIAL APPLICABILITY

The receiver of the present invention is useful as, e.g., the receiver for receiving a transmitted radio wave including information by the antenna. In particular, the receiver of the present invention is suitable as, e.g., the receiver including the antenna receiving a terrestrial television broadcast wave.

DESCRIPTION OF REFERENCE CHARACTERS

101 Output Portion
102 Stand Portion
103 Installation Surface
104 Angle
105 Reinforcing Plate
106 Antenna Portion
107 Space
201 Display Section
202 Sound Producing Section
203 Display Terminal
204 Sound Producing Terminal
301 Directivity
302 Direction
303 Direction
401 Vertical Length
402 Horizontal Length
501 First Movable Portion
502 Sliding Portion
503 Second Movable Portion
504 Third Movable Portion
601 First Reinforcing Portion
602 Second Reinforcing Portion
603 Fourth Movable Portion
604 Fifth Movable Portion
605 Sixth Movable Portion
701 First Antenna Element
702 Second Antenna Element
801 Second Antenna Portion
901 Directivity

The invention claimed is:

1. A receiver for receiving information transmitted by a radio wave, comprising:
   an output portion configured to output information which is receivable by a viewer or another receiver;
   a stand portion contacting the output portion and an installation surface and configured to hold the output portion on the installation surface at an angle suitable for receiving the information or viewing an image;
   a reinforcing portion contacting the output portion and the stand portion at points other than a contact point between the output portion and the stand portion and configured to reinforce the output portion and the stand portion so that the angle is maintained; and
   an antenna portion arranged in a space defined by the reinforcing portion, the stand portion and the output portion, and disposed on an external surface of the reinforcing portion, and configured to receive the radio wave.

2. The receiver of claim 1, wherein a horizontal length of the antenna portion is longer than a vertical length of the antenna portion to a ground surface.

3. The receiver of claim 1, wherein in the antenna portion, a gain for horizontally-polarized wave is higher than a gain for vertically-polarized wave in a predetermined direction.

4. The receiver of claim 1, wherein a contact point of the reinforcing portion with the output portion or the stand portion is movable.

5. The receiver of claim 1, wherein a contact point of the antenna portion with the output portion, the stand portion, or the reinforcing portion is movable.

6. The receiver of claim 1, wherein the reinforcing portion includes a movable portion at a point other than the contact point of the reinforcing portion with the output portion or the stand portion.

7. The receiver of claim 1, wherein the antenna portion includes a movable portion at a point other than the contact point of the antenna portion with the output portion, the stand portion, or the reinforcing portion.

8. The receiver of claim 1, wherein part of an outer portion of the output portion, the stand portion, or the reinforcing portion is made of nonmetal.

9. The receiver of claim 1, wherein the antenna portion is a diversity antenna or an array antenna including a plurality of antenna elements.

10. The receiver of claim 1, further comprising:
    a second antenna portion different from the antenna portion,
    wherein the antenna portion and the second antenna portion form a diversity antenna or an array antenna.

* * * * *